US009952598B2

(12) United States Patent
Ueda et al.

(10) Patent No.: US 9,952,598 B2
(45) Date of Patent: Apr. 24, 2018

(54) MOBILE ROBOT SYSTEM AND METHOD FOR CONTROLLING MOBILE ROBOT

(71) Applicant: Hitachi, Ltd., Chiyoda-ku, Tokyo (JP)

(72) Inventors: Taishi Ueda, Tokyo (JP); Ryosuke Nakamura, Tokyo (JP); Azusa Amino, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/157,455

(22) Filed: May 18, 2016

(65) Prior Publication Data

US 2016/0370802 A1 Dec. 22, 2016

(30) Foreign Application Priority Data

Jun. 22, 2015 (JP) ................................ 2015-124355

(51) Int. Cl.
*G05D 1/02* (2006.01)

(52) U.S. Cl.
CPC .......... *G05D 1/0214* (2013.01); *Y10S 901/01* (2013.01); *Y10S 901/46* (2013.01); *Y10S 901/47* (2013.01)

(58) Field of Classification Search
CPC .. G05D 1/0033; G05D 1/0088; G05D 1/0227; G05D 1/024; G05D 1/0255; G05D 1/0257; G05D 1/0274; G05D 1/0278; G05D 2201/0203; G05D 2201/0206; G05D 2201/0207; G05D 2201/0209; G05D 2201/0211; G05D 2201/0216; G01C 21/00; G01C 21/20; B25J 5/007; B25J 9/08; H04L 45/42; H04W 40/10; H04W 40/12; H04W 40/30; H04W 84/18; H04W 8/005; Y02B 60/50; Y10S 901/01

USPC .......................... 701/2, 26; 700/258; 370/338
See application file for complete search history.

(56) References Cited

U.S. PATENT DOCUMENTS

| | | | |
|---|---|---|---|
| 2006/0023677 A1 * | 2/2006 | Labrador | ................ H04L 45/42 370/338 |
| 2009/0326713 A1 | 12/2009 | Moriya | |
| 2010/0235033 A1 * | 9/2010 | Yamamoto | ............. G05D 1/024 701/26 |

(Continued)

FOREIGN PATENT DOCUMENTS

| CN | 103558856 A * | 2/2014 | ............... G05D 1/02 |
|---|---|---|---|
| JP | 2009-291540 A | 12/2009 | |

*Primary Examiner* — Anne M Antonucci
*Assistant Examiner* — Sanjeev Malhotra
(74) *Attorney, Agent, or Firm* — Crowell & Moring LLP (57) ABSTRACT

A mobile robot system capable of estimating the occurrence of various risks within its environment and executing appropriate processing to achieve an objective is provided. The mobile robot system includes an environment recognition unit for recognizing an external environment, a travelling unit, and a travelling control unit which controls the travelling unit on the basis of environment information from the environment recognition unit. The mobile robot system also includes a calculation unit which generates a travelling command to the travelling control unit, a potential risk area recognition unit, and a risk occurrence condition detection unit. When a risk occurrence condition is satisfied, the calculation unit calculates a degree of influence of the occurring risk on achievement of an objective quantitatively in each stage. When the possibility of achieving the object is low, a movement planning unit replans a moving route to raise the possibility of achieving the objective.

8 Claims, 6 Drawing Sheets

(56) References Cited

U.S. PATENT DOCUMENTS

2012/0083924 A1* 4/2012 Jones ..................... B25J 5/007
  700/258
2016/0378110 A1* 12/2016 Phillips ................ G05D 1/0033
  701/2
2017/0056262 A1* 3/2017 Yamada ............... A61G 7/1038

* cited by examiner

| POTENTIAL RISK AREA | POTENTIAL RISK | OCCURRENCE CONDITION 1 | OCCURRENCE CONDITION 2 | OCCURRENCE CONDITION 3 |
|---|---|---|---|---|
| ON MANHOLE | SLIP AND FALL | RAIN | - | - |
| IN LAVATORY | SLIP AND FALL | TIME | CLEANING STAFF IS PRESENT | - |
| UNDER SUSPENDED OBJECT | OBJECT FALLING | EARTHQUAKE | - | - |
| NEAR WINDOW | FALL DUE TO GUST OF WIND | STRONG WIND | WINDOW IS OPEN | - |
| IN SHADE | SLIP AND FALL | RAIN/SNOW ON DAY BEFORE | TIME | PREDETERMINED TEMPERATURE OR BELOW |
| ENTIRE OUTDOOR AREA | MALFUNCTION DUE TO WETTING OR SLIP | RAIN/SNOW, RAIN/SNOW ON DAY BEFORE | PREDETERMINED TEMPERAUTRE OR BELOW | - |

[FIG. 8]

MOBILE ROBOT SYSTEM AND METHOD FOR CONTROLLING MOBILE ROBOT

TECHNICAL FIELD

The present invention relates to a mobile robot system and a method for controlling a mobile robot, and particularly to a mobile robot system and a method for controlling a mobile robot suitable for recognition of an external environment and autonomous movement.

BACKGROUND ART

Recently, as an autonomously moving robot, a mobile robot which autonomously moves, recognizing its external environment, is known. It is dangerous if the mobile robot collides with an obstacle. Therefore, for example, a technique is known in which a system for reducing the risk of a collision with an object during the movement of the mobile robot, as its specific operation, generates an environment map showing geometric conditions of the environment including the object, then compares data of the moving route through which the mobile robot moves with a coordinate system of the environment map, finds a risk parameter indicating the possibility of a collision with the object due to a control error during the movement of the mobile robot, and thereby avoids a collision with the obstacle in the movement environment. Such a technique is disclosed, for example, in JP-A-2009-291540.

CITATION LIST

Patent Literature

PTL 1: JP-A-2009-291540

SUMMARY OF INVENTION

Technical Problem

However, in the movement environment of the mobile robot, there is also an area where the mobile robot is likely to fall down or malfunction due to weather or floor conditions, other than a collision with the obstacle. For example, when it is raining, an indoor area near the entrance is slippery and the mobile robot can slip and fall down. Under the eaves after a snowfall, a lump of snow can drop and directly hit the mobile robot, causing the mobile robot to malfunction. Thus, for example, measures can be taken, such as causing the mobile robot to stand up again without malfunctioning after falling down, or making the robot robust enough not to malfunction even when snow or the like directly hits the robot.

However, in the case where the objective of the movement of the mobile robot is to transport a fragile object, the transported object can be broken due to the impact of a fall or the like of the mobile robot, and there are cases where its objective cannot be achieved even if the mobile robot itself does not malfunction. If such falls, malfunctions and other factors in obstructing the achievement of the objective of the robot are called risks, the mobile robot needs to estimate such risks and perform appropriate processing to achieve its objective.

Thus, there is a method for estimating risks, for example, by recognizing the degree of wetness on the floor or the snow or the like on the roof with a sensor installed in the mobile robot or its environment. However, it is difficult to recognize the degree of wetness on the floor directly with the sensor, and in many cases, areas that fall in blind spots of the sensor, such as the top of the roof, cannot be recognized. Also, in order to compensate for the blind spots, there is a method for monitoring the occurrence of risks by installing a sensor in an area in the movement environment where potential risks exist. However, if a large number of sensors are needed, the economic cost is high and the risk of privacy violation arises.

The invention is to solve at least one of the foregoing problems and to provide a mobile robot system and a method for controlling a mobile robot which enable reducing various risks that obstruct its objective by a method without using a direct recognition method with a sensor.

Solution to Problem

In order to achieve the above objective, a configuration according to the invention includes: a travelling mechanism; a travelling control unit which controls the travelling unit; a movement planning unit which plans a moving route in order to achieve a predetermined objective; and a movement control unit which generates a travelling command to the travelling control unit so as to travel through the moving route. If the moving route includes a potential risk area, the movement planning unit calculates a possibility of achieving the objective according to whether a risk occurrence condition applies. If the possibility of achieving the objective is low, the movement planning unit replans to raise the achievement of the objective.

More specifically, a mobile robot system includes: an environment recognition unit for recognizing an external environment; a travelling unit; a travelling control unit which controls the travelling unit on the basis of environment information from the environment recognition unit; a calculation unit which generates a travelling command to the travelling control unit; a potential risk area recognition unit; and a risk occurrence condition detection unit. The calculation unit includes an objective setting unit, an occurring risk attribute recognition unit, and an own location recognition unit, and also includes a movement planning unit. A potential risk area where there is a potential risk that occurs due to a change in weather or road surface and a risk occurrence condition are recognized by the potential risk area recognition unit. The risk occurrence condition is detected by the risk occurrence condition detection unit. When the risk occurrence condition is satisfied, the calculation unit calculates a degree of influence of the occurring risk on achievement of an objective quantitatively/in stages. A moving method/moving route near an area where the risk has occurred is planned. The system includes a mobile robot which autonomously moves on the basis of the plan.

Advantageous Effect of Invention

According to this device, it is possible to execute appropriate processing in order to achieve an objective, at the occurrence of various risks in the environment.

DESCRIPTION OF EMBODIMENTS

Hereinafter, examples as specific forms of carrying out the invention will be described using the drawings. Problems, configurations and advantageous effects other than those described above will be clarified by the description of embodiments below.

The mobile robot system according to the invention is applied to a system which causes a robot to autonomously move, for example, for the purpose of delivery, guidance, monitoring, inspection, search, rescue, information transmission, maintenance and the like.

Hereinafter, forms of carrying out the invention (referred to as "embodiments") will be described in detail with reference to the drawings according to need. In the drawings, similar components are denoted by the same reference signs and description of these components is omitted. Also, the components and mechanisms of the system are not limited to those described below, and suitable changes and additions can be made as long as the functions of each functional component can be implemented.

Example 1

Figure 1:
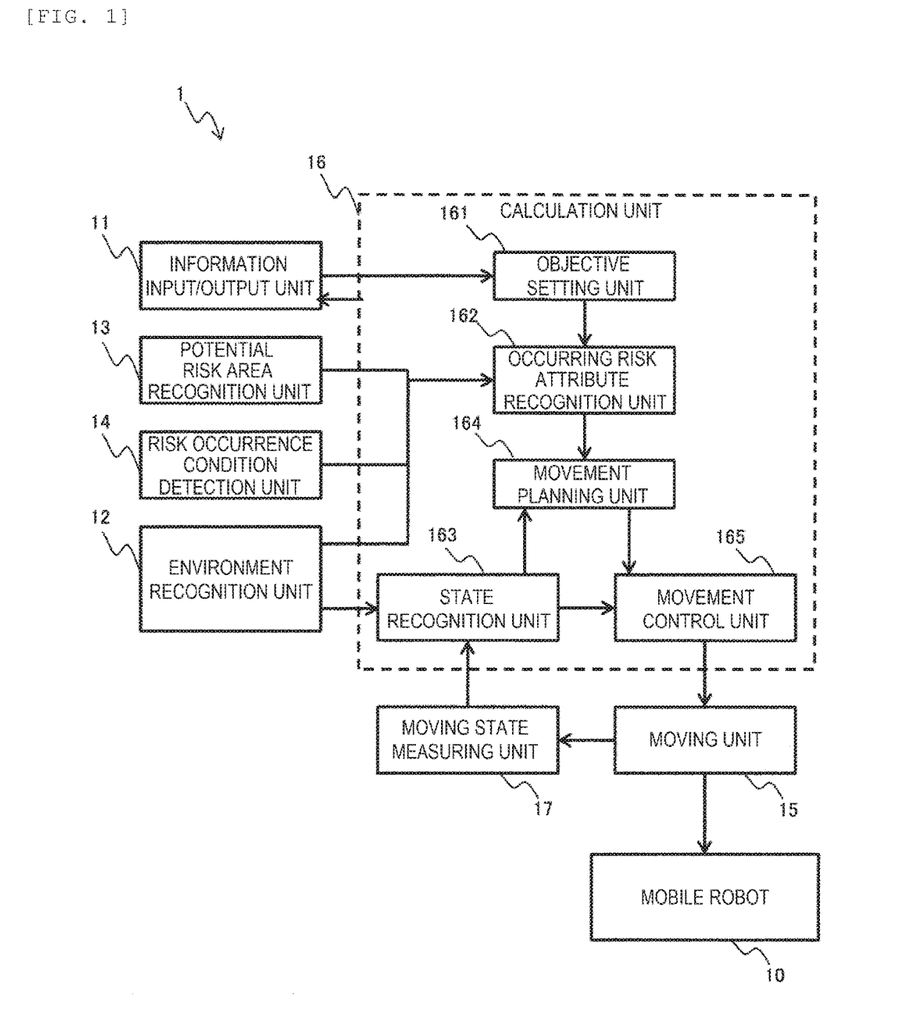
FIG. 1 is a system configuration diagram of a mobile robot system according to the invention.

Referring to FIG. 1, the system configuration of a mobile robot system 1 in this example will be described. Specific examples of respective units and detailed operations of components will be described later. The mobile robot system 1 has: a mobile robot 10; an information input/output unit 11 for exchanging information with an external device or a person; an environment recognition unit 12 for recognizing an obstacle or external environment shape; a potential risk area recognition unit 13 for recognizing an area (referred to as a potential risk area) where a risk can occur due to conditions such as weather, for example; a risk occurrence condition detection unit 14 for detecting a condition which causes occurrence of a risk in the potential risk area (referred to as risk occurrence condition), such as wetness on the floor, vibration, and time, for example; a moving unit 15 for moving the mobile robot 10; a calculation unit 16 which calculates output information such as route and speed on the basis of the information from each unit and component; and a moving state measuring unit 17 which measures an output signal from the moving unit 15 and an actual moving speed. Also, the calculation unit 16 has: an objective setting unit 161 which sets an objective of the movement of the mobile robot system on the basis of the information from the information input/output unit 11; an occurring risk attribute recognition unit 162 which recognizes the type of an obstacle or occurring risk and its positional relation with the mobile robot 10 (collectively referred to as occurring risk attribute) on the basis of the information from the environment recognition unit 12, the potential risk area recognition unit 13 and the risk occurrence condition detection unit 14; a state recognition unit 163 which recognizes the position, posture, speed and presence/absence of malfunctioning of the mobile robot (referred to as own state) on the basis of the external environment shape acquired from the environment recognition unit 12 and information acquired from the moving state measuring unit 17; a movement planning unit 164 which plans a moving method for the mobile robot according to the occurring risk attribute acquired from the occurring risk attribute recognition unit 162 and the state acquired from the state recognition unit 163; and a movement control unit 165 which performs signal processing for actuating the moving unit as planned by the movement planning unit 164. Here, the movement plan refers to, for example, a position and speed which the mobile robot 10 should take after actuation, expressed in time series at a predetermined time interval or at a predetermined distance interval.

Figure 2:
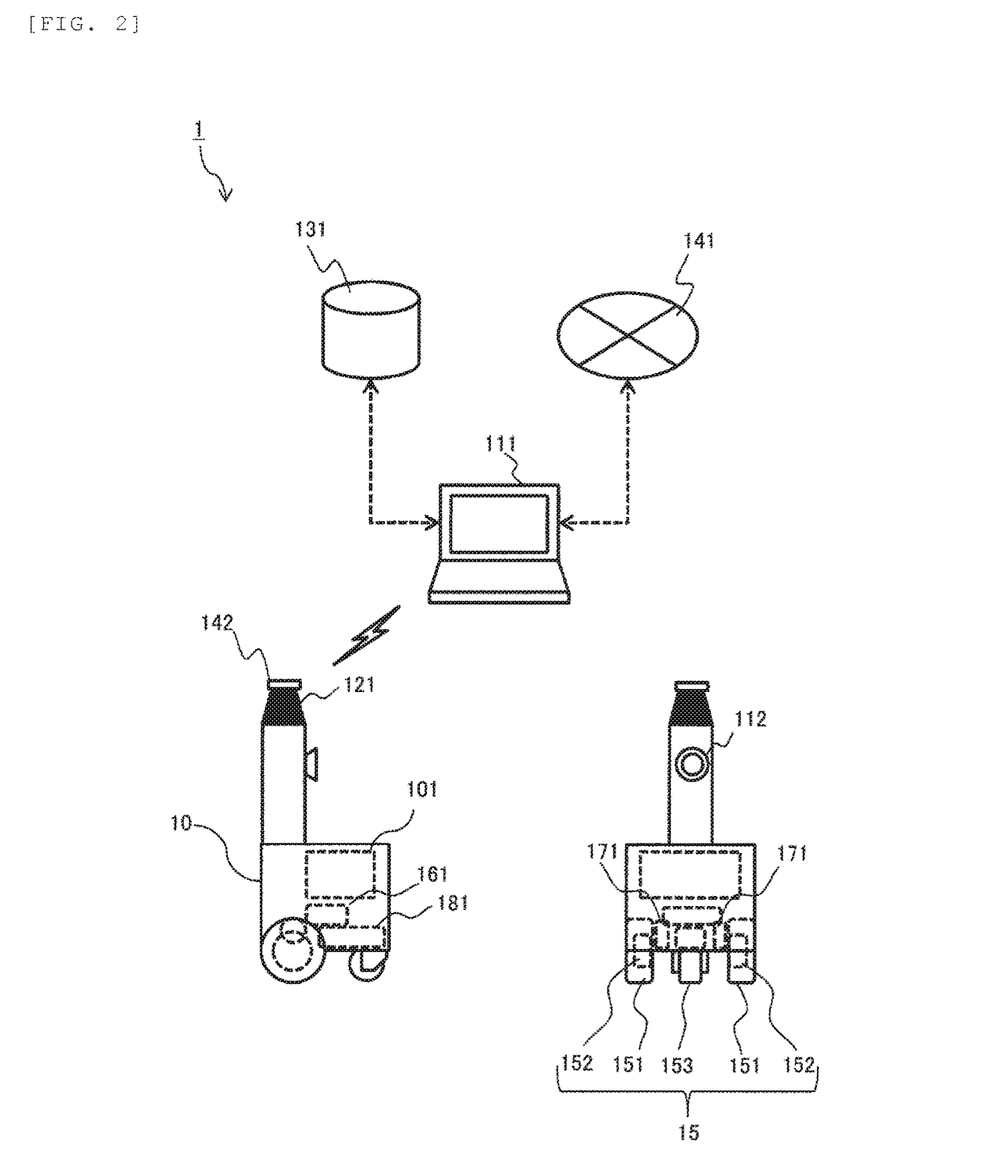
FIG. 2 is an example of hardware installation in a mobile robot system in Example 1.

Referring to FIG. 2, an example of the hardware configuration of the mobile robot system 1 will be described. The mobile robot system 1 shown in FIG. 2 uses a terminal 111 and a speaker 112 as the information input/output unit 11; a database 131 in which position information of a potential risk area on a predetermined coordinate system and a risk occurrence condition are registered, as the potential risk area recognition unit 13; and a weather acquisition program 141 which acquires weather information from the internet and a rain sensor 142 which detects raindrops, as the risk occurrence condition detection unit 14. Also, the mobile robot 10 has: a laser range scanner 121 as the environment recognition unit 12; a pair of left and right drive wheels 151 and servo motors 152 and a universal wheel 153, as the moving unit 15; an embedded computer 161 as the calculation unit 16; a pair of left and right encoders 171 as the moving state recognizing unit 17; and a battery 181 as a power source for each of the components. Moreover, the terminal 111 and the mobile robot 10 are connected and communicate with each other via a wireless LAN, and the terminal 111, the database 131 and the weather acquisition program 141 are connected and communicate with each other via a wireless LAN or wired LAN network. By thus installing the potential risk area recognition unit 13 and the risk occurrence condition detection unit 14 on the network, it is possible to reduce the weight of the mobile robot 10 and simplify the processing in the calculation unit 16, compared with the case where the recognition units 13 and 14 are installed in the mobile robot 10. Also, if the recognition units 13 and 14 are shared by a plurality of mobile robots 10, it is possible to reduce the production cost when mass-producing the mobile robots 10. Moreover, by attaching the rain sensor 142 to the mobile robot, it is possible to acquire rain information in real time. Also, the mobile robot 10 is assumed to have an appropriate attachment component according to the objective, for example, having a housing section 101 for accommodating an object to be delivered in the case where the mobile robot moves for the purpose of delivery.

Figure 3:
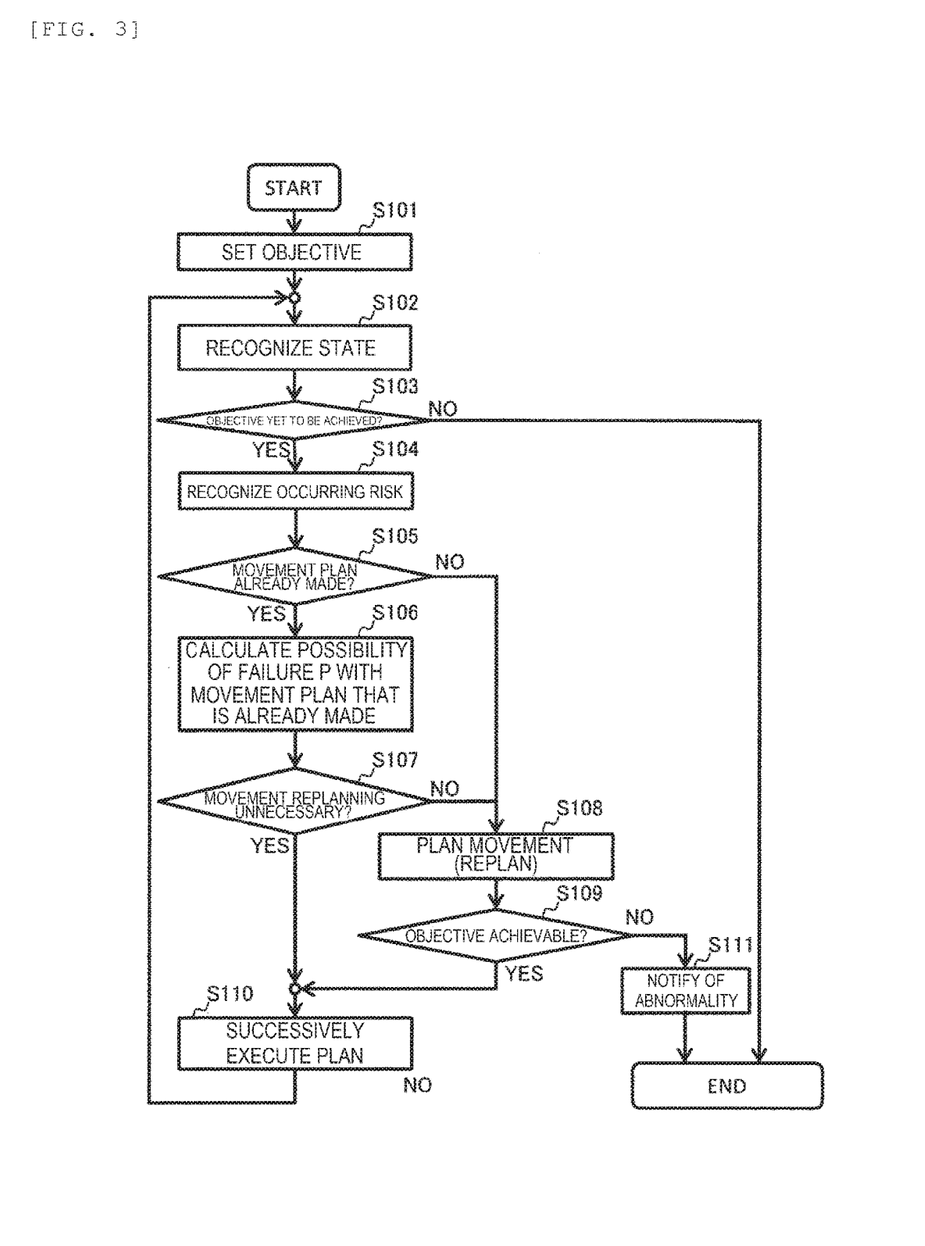
FIG. 3 is a flowchart of operations in the mobile robot system according to the invention.

Referring to FIG. 3, an operation flow of the mobile robot system 1 will be described. The loop section in this operation flow is assumed to be repeated periodically on a predetermined control cycle. Each function of the hardware configuration shown in FIG. 2 is implemented.

In S101, the objective setting unit 161 sets an objective of the movement of the mobile robot 10 on the basis of the information from the information input/output unit 11 (objective setting unit 161). As a method for setting an objective, for example, a method of setting a target state $S_T = S_{T1}, S_{T2}, \ldots, S_{Tn}$) made up of items such as the positional relation of the mobile robot 10, the operation target object and the ambient environment, and time, when the objective is achieved, may be employed. Here, n is a natural number and $S_{Tk}$ expresses the foregoing items as a value. For example, if the objective is delivery, the position of the mobile robot 10 being at the coordinates of the delivery destination, the temperature of the object to be delivered being a predetermined temperature or below, absence of damage, arrival before target arrival time, or the like, is suitably converted into a numerical value and set as the target state $S_T$.

In S102, the state recognition unit 163 recognizes the current state $S_C$ of the mobile robot 10 and the object to be delivered (state recognition unit 163). For example, the moving speed of the mobile robot 10 can be calculated on the basis of the rotation speed of the wheels from the encoders 171. Also, the position of the mobile robot can be calculated on the basis of the environment shape information acquired from the laser range scanner 121, suitably using a method disclosed in Japanese Patent No. 452442 or the like, for example. Moreover, for example, if the objective of the mobile robot 10 is delivery, the temperature, shape or the like of the object to be delivered, housed in the housing section 101 is recognized, using a thermometer, camera, three-dimensional laser sensor, ultrasonic sensor, magnetic sensor or the like attached to the housing section 101 according to need.

The respective functions of S103 to S109 and S111 correspond to the occurring risk attribute recognition unit 162 and the movement planning unit 164.

In S103, whether the objective is achieved or not is examined. For example, if, with respect to the difference $D_S = S_T - S_C$ between the target state $S_T$ set in S101 and the state $S_C$ at the time, $R = C_S D_S^T$ is a predetermined value or above, it may be determined that the objective is yet to be achieved. However, $C_S$ is a weight coefficient vector with the same length as $D_S$, and $D_S^T$ expresses a transposed vector of $D_S$. By setting the value of each component of $C_S$ to be greater for an item to be achieved preferentially, it is possible to make operation adjustment corresponding to the objective of the mobile robot. Alternatively, for example, in the case where the target state is having a value within a specific range, such as being earlier than specific time or having a temperature below a specific temperature, the difference from the target state may be expressed by a function that is always zero if the value is within the range and that is not zero otherwise. If the objective is yet to be achieved, the operation proceeds to S104. If the objective is already achieved, the operation ends.

Figure 4:
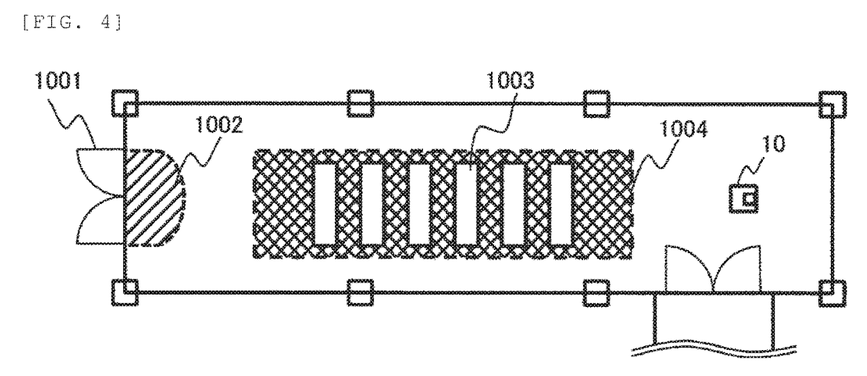
FIG. 4 is an example of the movement environment of a mobile robot.
Figure 5:
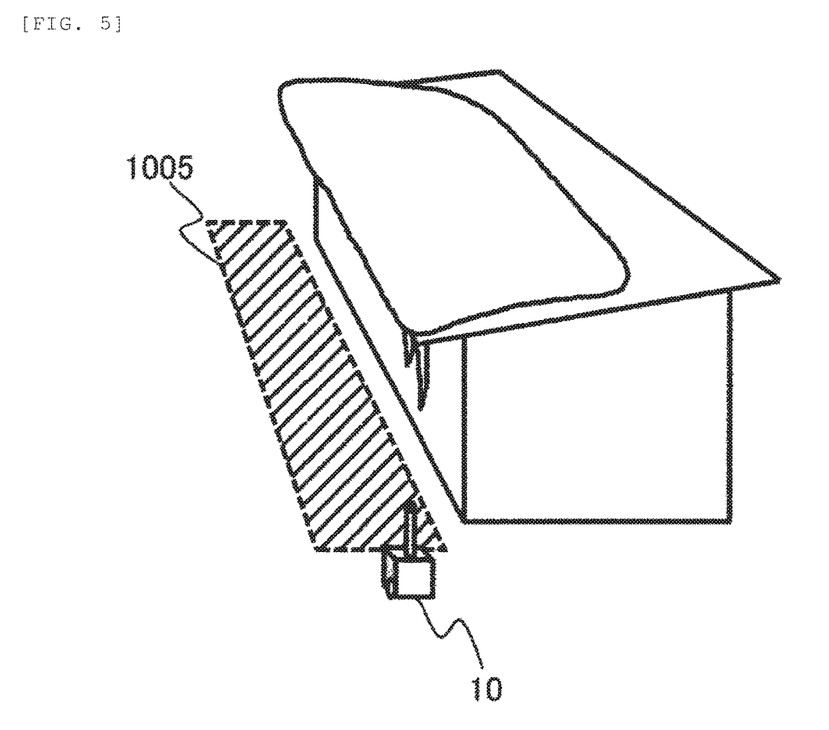
FIG. 5 is an example of the movement environment of a mobile robot.
Figure 6:
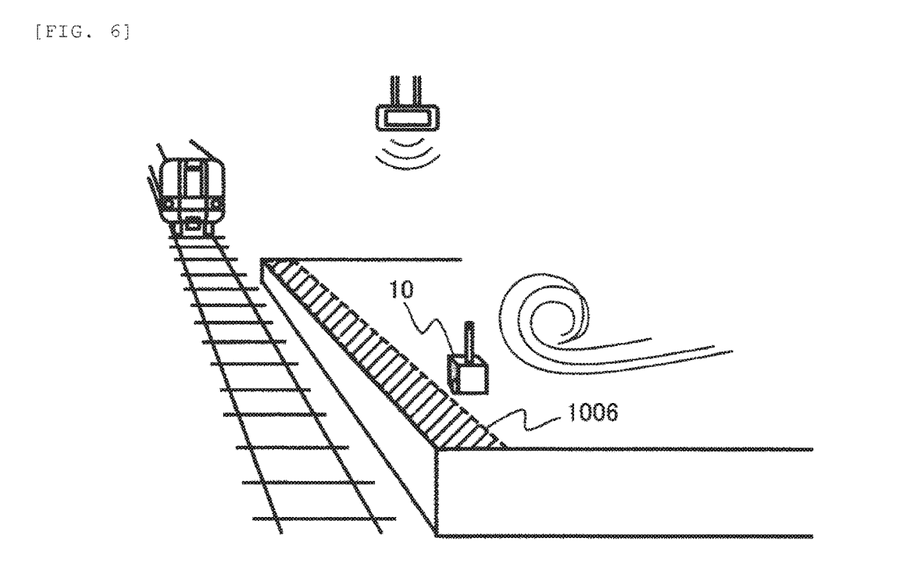
FIG. 6 is an example of the movement environment of a mobile robot.
Figure 7:
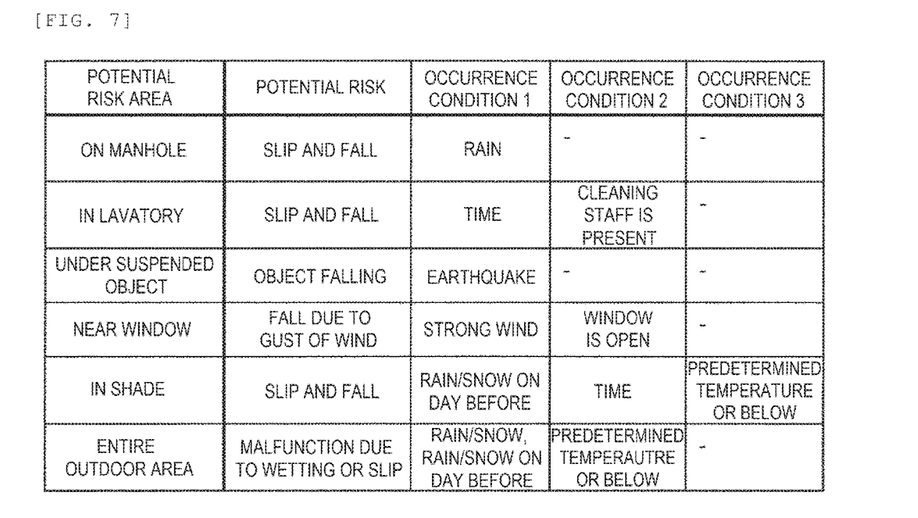
FIG. 7 is examples of a potential risk area, a potential risk and a risk occurrence condition.

In S104, recognition of an occurring risk is carried out. A method for this is described, using the case where the mobile robot 10 moves in an indoor environment shown in FIG. 4, as an example. It should be noted that FIG. 4 is a bird's-eye view of the indoor environment viewed from directly above. An area 1002 near an entrance 1001 becomes wet and slippery when it is raining. In this case, the area 1002 as a potential risk area, and rainfall and snowfall as a risk occurrence condition of the area 1002, are registered in the database 131 in advance. Then, if the weather acquired by the weather acquisition program 141 is fine weather, the area 1002 can be expected to be dry and therefore the possibility of a fall is low. However, if it is rainy or snowy, the area 1002 is likely to be wet and it is regarded that there is a risk of slipping and falling. Also, the surrounding area of bookshelves 1003 is safe in normal time, but when an earthquake happens, books may collapse or the bookshelves may fall down. Thus, an area 1004 around the bookshelves as a potential risk area, and earthquake as a risk occurrence condition, are registered in the database 131 in advance. When the weather acquisition program 141 acquires earthquake information such as the Earthquake Early Warning, it is regarded that there is a risk of objects tumbling and falling in the area 1004. Similarly, when the mobile robot system 10 moves under the outdoor eaves, as shown in FIG. 5, by defining an area 1005 under the eaves as a potential risk area, and snowfall that continued until immediately before as a risk occurrence condition, it is possible to recognize the occurrence of a risk of a lump of snow falling from the top of the roof. Also, if an area 1006 at an edge of a platform at a railway station is defined as a potential risk area, and that a strong wind is blowing or that an announcement that a train is approaching is being given is defined as a risk occurrence condition, as shown in FIG. 6, being fanned by the strong wind and falling off from the platform, or contacting the approaching train or the like can be recognized as an occurring risk. FIG. 7 shows specific examples of the potential risk area, the potential risk and the risk occurrence condition, other than the foregoing examples. Since the potential risk area recognition unit and the risk occurrence condition detection unit are provided as described above, even when it is difficult to detect an occurring risk directly with a sensor or the like, it is possible to estimate the occurrence of a risk by examining whether the risk occurrence condition is satisfied in the potential risk area or not.

In S105, whether the movement plan is already made or not is examined. If the movement plan is already made, the processing goes to S106. If not, the processing goes to S108.

In S106, a possibility of failure P when the movement plan that is already made is executed is calculated in stages/quantitatively. For example, there is a method in which a function is set which increases the value of an item $e_k$ such as the possibility of damage to the mobile robot, the possibility of damage to the object to be transported, or the excess over the time limit, as the distance or time of passing through a risk occurring area increases, and then a total value of appropriate weights on all the cost items, $P = C_E E^T$, is defined as the possibility of failure. Here, $C_E$ represents a weight coefficient vector with the same length as E. E is represents a vector which holds $E = \{e_1, e_2, \ldots e_m\}$. $E^T$ represents a transposed vector of E. Also, $C_E$ is suitable set according to the type of the occurring risk, the objective, and the speed, acceleration, posture and the like of the mobile robot within the risk occurring area.

In S107, whether replanning of the movement plan is necessary or not is determined, using the possibility of failure P calculated in S106. For example, if P is above a preset threshold $P_{max}$ or equal to or above the possibility of failure $P_{pre}$ corresponding to the previous control cycle, it is determined that movement replanning is necessary, and the processing goes to S108. Otherwise, it is determined that movement replanning is unnecessary, and the processing goes to S109.

In S108, movement planning (replanning of the movement plan) is made in such a way that the possibility of failure P becomes lower than in the current state. As a method for movement planning, for example, there is a method which applies an algorithm described in Korf, R., "Real-Time Heuristic Search," Artificial intelligence, Vol. 42, No. 2-3, pp. 189-211, 1990. In the algorithm, the inside of a movement environment is resolved into a fine grid of spaces, and for each grid space, data with cost information (referred to as cost) such as the time and effort required for moving from the current location to the grid space and the possibility of failure P is prepared. Then, in order from the grid space next to the current location, the cost and an estimate value (referred to as heuristic) of the movement, cost from the grid space to a target point are calculated, and a grid space where the sum of the cost and the heuristic (referred to as score) is the smallest is sequentially searched for, thus deciding a moving route and behavior of the mobile robot 10 on the grid space. As the heuristic, the distance from the grid space to the target point, or the like, may be suitably used. Then, in the search, if the possibility of failure P is set to change according to the state of the mobile robot 10 such as speed, acceleration and posture in the grid space of the search target, it is possible to calculate a state and route which the mobile robot 10 should take on each grid space, by comparing results of the search on grid space corresponding to various states and selecting an optimum state. Also, if the mobile robot 10 cannot move along the grid spaces because of kinematic reasons, a route formed by complementing grid spaces with a smooth curve such as a spline curve may be generated. Thus, for example, in the case of the environment of FIG. 4, when it is raining, it is possible to provide a limitation to the acceleration of the mobile robot 10 when moving within the area 1002, or to replan the speed and route of the mobile robot 10 in such a way as not to enter into the area 1002. Also, if the objective is monitoring or rescue, by setting $S_T$ and $E_T$ to reflect the physical safety of people in the surroundings, when an earthquake happens, it is possible for the mobile robot 10 to focus its observation on the area 1004, or to autonomously urge or guide people in the area 1004 to evacuate. Also, the function of outputting a sound, alarm or the like from the speaker 112 may be added to communicate to the surroundings that the area 1004 is dangerous.

In S109, the possibility of achievement of the objective is determined. For example, if the mobile robot 10 is damaged by a factor such as falling and is thus unable to move, the achievement of the objective is impossible. If the achievement of the objective is impossible, the processing goes to S111 to notify the outside of the abnormality via the information input/output unit 11. If it is possible, the processing goes to S110.

In S110, a command scheduled to be executed on the control cycle is successively executed so as to follow the prepared movement plan (movement control unit 165), and the processing returns to S102.

The above flow enables the mobile robot 10 to estimate the occurrence of a risk by examining whether a risk occurrence condition is satisfied or not, in a potential risk area, and to make an appropriate movement to achieve its objective, even when it is difficult to detect an occurring risk directly with a sensor or the like.

Example 2

Figure 8:
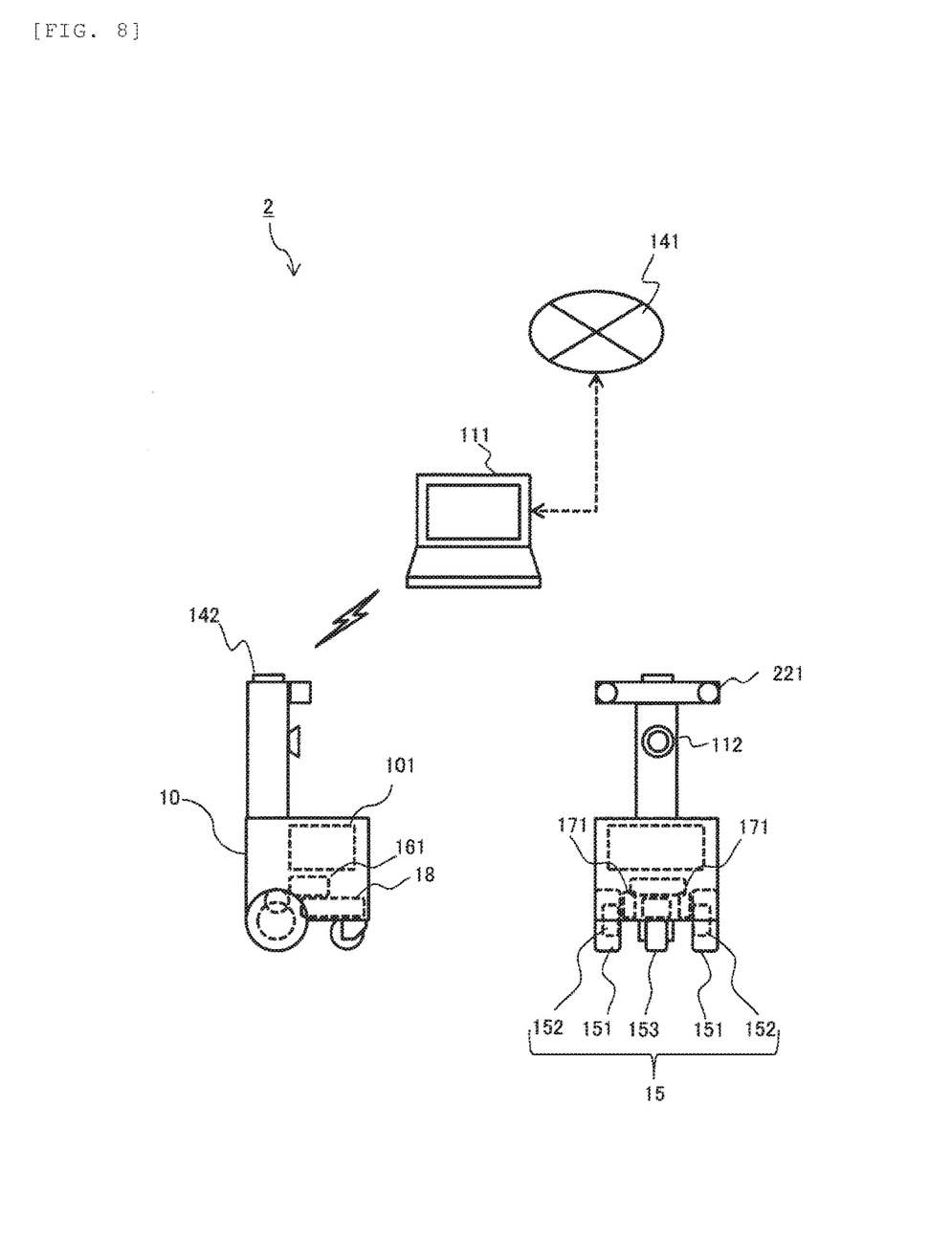
FIG. 8 is an example of hardware installation in a mobile robot system in Example 2.

In this example, a mobile robot system 2 in which a stereo camera 221 serves as both the potential risk area recognition unit 13 and the environment recognition unit 12, as shown in FIG. 8, thus enabling safe movement even in an environment where the mobile robot moves for the first time, will be described.

In the mobile robot system 2, the stereo camera 221 recognizes a potential risk area such as the entrance 1001 or the bookshelves 1003 of FIG. 4, for example, and an accompanying risk occurring condition. In the recognition, for example, a method of saving an image of a potential risk area in the embedded computer 161 in advance and then comparing the image with a pickup image to determine whether the image is a potential risk area, or the like, is employed. The positional relation between the potential risk area and the robot 10 can be calculated on the basis of the parallax between left and right images acquired by the stereo camera.

Thus, the mobile robot system 2 enables safe movement even in an environment where the mobile robot moves for the first time.

The invention is not limited to the above examples and includes various modifications. For example, the above examples are described in detail in order to intelligibly explain the invention and are not necessarily limited to having all the configurations described. Also, a part of the configuration in an example can be replaced with the configuration in another example, and the configuration in an example can be added to the configuration in another example. Also, with respect to a part of the configuration in each example, addition, deletion or replacement with another configuration can be made.

For example, if the information input unit 11 is installed in the mobile robot 10, a desired objective can be set on the mobile robot easily anywhere. Also, as the information input unit 11, a touch panel, tablet terminal, mobile phone, smartphone, speech recognition system, gesture input system or the like may be suitably used.

As the potential risk area recognition unit 13, a single-lens camera or ultrasonic sensor, for example, can be suitably used. Also, a transmitter which generates a radio wave signal may be installed near a potential risk area in advance, and the potential risk area may be recognized on the basis of the signal. Alternatively, in the mobile robot system 2 in Example 2, if a template image used for the recognition of a potential risk area is saved in a database outside the mobile robot 10, it is possible to reduce the size and weight of the mobile robot 10 and also recognize the potential risk area even in an environment, where the mobile robot moves for the first time.

As the risk occurrence condition detection unit 14, a temperature sensor, light quantity sensor, microphone, droplet sensor, humidity sensor, camera, vibration sensor, wind speed sensor or the like installed inside or outside the movement environment or in the mobile robot 10, for example, may be suitably used.

As the environment recognition unit 12, a single-lens camera, three-dimensional laser scanner, or ultrasonic sensor, for example, may be suitably used.

Also, if the calculation unit 16 is installed outside the mobile robot 10, it is possible to achieve a reduction in weight and cost of the mobile robot. Meanwhile, if all the components are provided inside the mobile robot 10, a mobile robot system capable of operating without depending on its installation environment can be realized.

As the moving unit, legs, propellers, hoverer, wings, crawler or the like, for example, can be suitably used, other than wheels.

Also, a part or all of each of the above configurations, functions, units, processing measures and the like may be implemented by hardware, by being designed on an integrated circuit, for example. Also, each of the above configurations, functions and the like may be implemented by software, by having a processor interpret and execute a program which implements each function. Information such as a program, table, file and the like to implement each function can be stored in a recording device such as a memory, hard disk or SSD (solid state drive), or in a recording medium such as an IC card, SD card, or DVD.

As the control lines and information lines, those considered necessary for explanation are shown and not all the control lines and information lines for the product are necessarily shown. In practice, almost all the configurations may be considered to be connected to each other.

REFERENCE SIGNS LIST 1 mobile robot system in Example 1
10 mobile robot
11 information input/output unit
12 environment recognition unit
13 potential risk area recognition unit
14 risk occurrence condition detection unit
15 moving unit
16 calculation unit
161 objective setting unit
164 movement planning unit
165 movement control unit

The invention claimed is:

1. A mobile robot system comprising:
a mobile robot having a travelling unit via which the mobile robot is moved;
a travelling control unit which controls the travelling unit;
a movement planning unit which plans a moving route for the mobile robot in order to achieve a predetermined objective; and
a movement control unit which generates a travelling command to the travelling control unit such that the mobile robot travels via the moving route, wherein
if the moving route includes a potential risk area, the movement planning unit calculates a possibility of achieving the objective based on determination of satisfaction of one or more of risk occurrence conditions that are registered in a database of the mobile robot system without directly detecting an occurring risk using a sensor, and
if the possibility of achieving the objective is equal to or lower than a predetermined threshold, the movement planning unit replans movement of the mobile robot to raise the possibility of achieving the objective.

2. The mobile robot system according to claim 1, further comprising:
a position recognition unit which recognizes a position of the mobile robot, wherein
the mobile robot system controls the mobile robot on the basis of the recognized position of the mobile robot.

3. The mobile robot system according to claim 2, further comprising:
an environment recognition unit for recognizing an external environment, wherein whether the risk occurrence condition is satisfied is determined on the basis of the environment recognition.

4. The mobile robot system according to claim 3, wherein the possibility of achieving the objective is lowered if there is a potential risk which occurs due to a change in weather or road surface.

5. The mobile robot system according to claim 1, wherein a degree of influence of an occurring risk on the achievement of the objective is calculated quantitatively on a step-by-step basis, based on which a moving method/moving route near an area where the risk has occurred is planned.

6. The mobile robot system according to claim 1, wherein, for detection of the risk occurrence condition, acquisition of weather information that is publicly available on the internet is utilized.

7. The mobile robot system according to claim 1, wherein, for detection of the risk occurrence condition, one of an image sensor, a temperature sensor, a light quantity sensor, a microphone, a droplet sensor, a humidity sensor, a camera, a vibration sensor, and a wind speed sensor installed in the mobile robot or in a movement environment, or a combination of a plurality of these, is utilized.

8. A method for controlling a mobile robot having a travelling unit via which the mobile robot is moved and which is controlled by a travelling control unit, the method comprising the steps of:
planning a moving route for the mobile robot in order to achieve a predetermined objective;
generating a travelling command to the travelling control unit such that the mobile robot travels via the moving route;
if the moving route includes a potential risk area, calculating a possibility of achieving the objective based on determination of satisfaction of one or more of risk occurrence conditions that are registered in a database of a mobile robot system without directly detecting an occurring risk using a sensor; and
if the possibility of achieving the objective is equal to or lower than a predetermined threshold, replanning movement of the mobile robot to raise the possibility of achieving the objective.

* * * * *